(12) United States Patent
Maillot

(10) Patent No.: US 7,034,824 B2
(45) Date of Patent: Apr. 25, 2006

(54) SYSTEM AND METHOD FOR COMPUTING A CONTINUOUS LOCAL NEIGHBORHOOD AND PARAMATERIZATION

(75) Inventor: Jerome Maillot, Toronto (CA)

(73) Assignee: Autodesk Canada Co., San Rafael, CA (US)

( * ) Notice: Subject to any disclaimer, the term of this patent is extended or adjusted under 35 U.S.C. 154(b) by 235 days.

(21) Appl. No.: 10/244,599

(22) Filed: Sep. 17, 2002

(65) Prior Publication Data

US 2004/0051712 A1    Mar. 18, 2004

(51) Int. Cl.
*G06T 15/30* (2006.01)
(52) U.S. Cl. .................. 345/423; 345/427; 345/581; 345/582; 703/2
(58) Field of Classification Search ............. 345/419, 345/423, 427, 582, 581; 703/2
See application file for complete search history.

(56) References Cited

U.S. PATENT DOCUMENTS 6,256,038 B1 * 7/2001 Krishnamurthy ............ 345/419
6,307,555 B1 * 10/2001 Lee ............................ 345/423
6,553,337 B1 * 4/2003 Lounsbery ..................... 703/2

* cited by examiner

*Primary Examiner*—Kimbinh T. Nguyen
(74) *Attorney, Agent, or Firm*—Staas & Halsey LLP

(57) ABSTRACT

The present invention relates to a system for interactively moving a hit point within a current triangle of the model, where the hit point defines a location of a brush stamp relative to the model, where a circle with a radius either defines the brush stamp or minimally contains the brush stamp. For each vertex of the current triangle containing the hit point, a sub-neighborhood of vertices of the model is defined by including in the sub-neighborhood vertices of the model that are within a distance of the hit point, the distance being a sum of the radius of the circle added to a length of a longest edge that is attached to the vertex. A sub-parameterization for each sub-neighborhood is then computed. The system then finds a barycentric coordinate of the hit point in the current triangle, where the barycentric coordinate has three barycentric values, each corresponding to a vertex of the current triangle. The system the computes a local parameterization by weighted averaging of the sub-parameterizations, where each sub-parameterization is weighted according to the barycentric value of the vertex of its sub-neighborhood.

26 Claims, 18 Drawing Sheets

3D

2D

SYSTEM AND METHOD FOR COMPUTING A CONTINUOUS LOCAL NEIGHBORHOOD AND PARAMATERIZATION

BACKGROUND OF THE INVENTION

1. Field of the Invention

The present invention is directed to a system for computing a continuous local neighborhood of a point on a polygonal mesh, which neighborhood may be used to compute a continuous local parameterization of the mesh.

2. Description of the Related Art

FIG. 1 shows a mapping between a 3D polygonal surface 100 and a 2D image or domain 102. The mapping or parameterization of polygonal geometric surfaces is sometimes referred to as image mapping, a category of techniques that includes texture mapping, reflection or environment mapping, bump mapping, light mapping, etc. Image mapping associates coordinates 103 in image space 102 with locations 104 on the surface 100 of a geometric object. The discrete samples of an image raster addressed by the coordinates in image space 102 are applied to the geometric object or surface 100.

Image mapping, a form of parameterizing, is a standard technique for adding visual details to 3D models. Nevertheless, image mapping tools are lacking, and defining a high quality parameterization for image mapping a 2D domain to a 3D polygonal model is a tedious process, even for experienced and skilled users.

What is needed is a system for defining a smoothly changing neighborhood of a polygon mesh surface, and using that smoothly changing neighborhood to compute a local parameterization that changes smoothly as a local area of the surface changes.

SUMMARY OF THE INVENTION

It is an aspect of the present invention to provide a system to automatically parameterize a reasonably small portion of a surface.

It is another aspect of the present invention to provide a system that can smoothly parameterize a changing portion of a surface.

It is yet another aspect of the present invention to provide a system to smoothly map a portion of a 3D surface to a 2D space that is being interactively moved or manipulated along or relative to the surface.

It is an additional aspect of the present invention to provide a system for continuous local parameterization that is stable with respect to user input parameters that change the continuous local parameterization.

It is still another aspect of the present invention to provide a system for continuous local parameterization that is suitable for interactive operations on a 3D surface.

It is also an aspect of the present invention to provide a system for continuous local parameterization that is suitable for interactively painting on a 3D polygon mesh surface.

It is another aspect of the present invention to provide a system for continuous local parameterization that is suitable for interactively moving, rotating, resizing, and reshaping a 2D space on a 3D polygon mesh surface.

It is a further aspect of the present invention to provide a system for maintaining a changing neighborhood of vertices of a surface having associated numerical values that change smoothly as the neighborhood changes.

It is yet another aspect of the present invention to provide a system for smoothly interpolating local numeric values on a local area of a mesh, as the local area changes.

The above aspects can be attained by a system that changes a region of interest that corresponds to a sub-portion of a model, and in response to the changing, automatically combines numerical values associated with vertices of two or more sub-neighborhoods of the model. The region of interest can be changed by being moved or resized within a region of intersection of two or more sub-neighborhoods. The numerical values can be combined based on the region of interest or a location of the region of interest. The sub-neighborhoods each are sets of vertices of the model, where the sets remain constant while the region of interest changes within the region of intersection. The numerical values can be parameterizations of the sub-neighborhoods, which may be combined to form a local parameterization that smoothly and continuously changes as the area of interest changes.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Introduction

Figure 1:
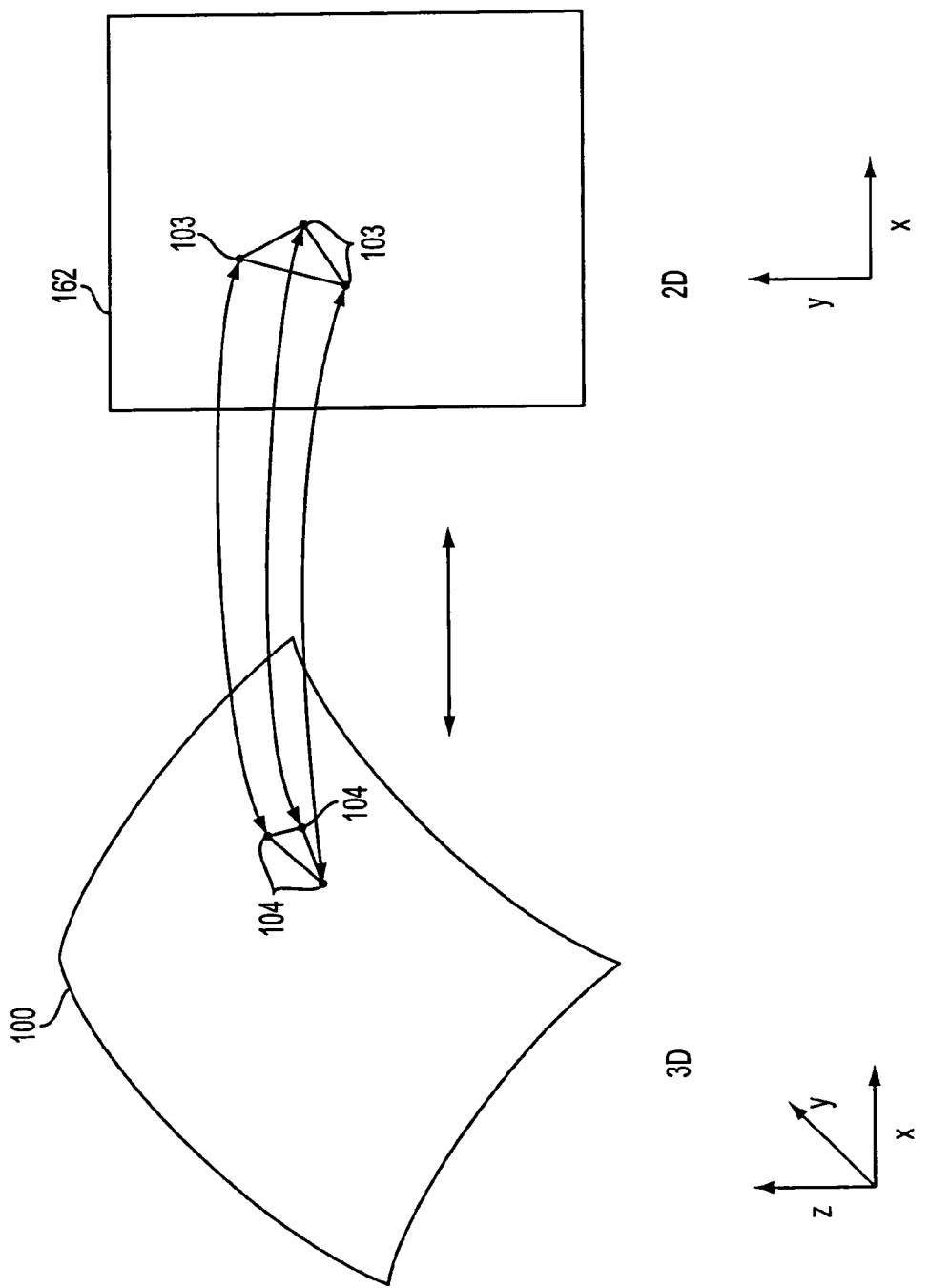
FIG. 1 shows a mapping between a 3D polygonal surface 100 and a 2D image or domain 102.

While a large number of mature commercial 2D painting tools are available, direct painting on 3D surfaces is a challenge. For one reason, 2D images consist of pixels arranged in a rectangular grid, which is a highly organized sample of pixels. Every pixel has naturally defined neighbors, orientation, and size. All the 2D paint operations and image transforms rely on this assumption. In contrast to 2D image data, 3D polygon surface meshes are unorganized, and a consistent global coordinate system is difficult to define. Traditionally, global UV parameterizations used for surface painting introduce distortion and discontinuities. A constrained optimization algorithm may be used to help the user define the parameterization, but the process is tedious, and requires human intervention. No satisfactory automatic parameterization methods exist.

One approach to 3D painting has been to custom-define a suitable parameterization and then two-dimensionally paint on the texture itself. This approach causes deformation and clipping, particularly along texture seams. However, in the case of 3D painting, operations are on only a sub-portion of the 3D surface. Therefore, it is not necessary to define a global parameterization (mapping or transformation) that maps the entire 3D surface. Rather than using a global or custom-defined parameterization for 3D operations like painting, the present invention builds a local parameterization on-the-fly. The local parameterization is small enough to be easily computed while minimizing local distortion and avoiding local seams. The local parameterization is large enough to enable non-trivial operations like 3D painting. Although the present invention is discussed in relation to 3D painting, the underlying technique is not so limited, and may be applied to other operations and higher dimensions.

Painting, within this specification, is defined to be the general modification of an image according to user input. The modification can include, but is not limited to the image mapping categories mentioned above (e.g. texture mapping, bump mapping, etc.). The user input is generally in the form of drawn curves called strokes. With 3D painting, strokes may be made either directly on the texture (the 2D domain), or they may be made on the 3D surface. Each stroke is actually a series of discrete samples or locations. When painting a stroke directly in texture space, the samples are based on the current positions of the brush in the UV texture space. When painting on a 3D surface, the samples are based on the current hit point, which is the point where the current view ray intersects the 3D surface (e.g., where the center of the brush contacts the surface). Painting is then completed by, for each sample, painting a single stamp of the brush onto the surface. The accumulation of many overlapping sampled stamps creates the impression of a solid thick line or other painting effect, such as a spray. More complex effects, like blurring, smearing, image filtering, etc. can also be achieved the same way. Effects of the type that are found in imaging applications, such as Adobe Photoshop can be extended into three dimensions.

Whether applying the brush to the 2D texture or applying the brush to the 3D surface, it is necessary to define a transformation or mapping between an individual stamp image and the 3D surface. Once the transformation or mapping is defined, a standard rendering algorithm can be used to paint every polygon, typically a triangle, individually in the texture, using the appropriate corresponding triangle read from the stamp image.

As mentioned in the Description of the Related Art, global parameterizations are problematic. In cases where only a portion of a mesh surface requires a parameterization, global parameterizations can be avoided by computing only a local parameterization of the surface mesh. A global parameterization may be used to define the painted texture, but most kinds of distortions or discontinuities are acceptable.

Figure 2:
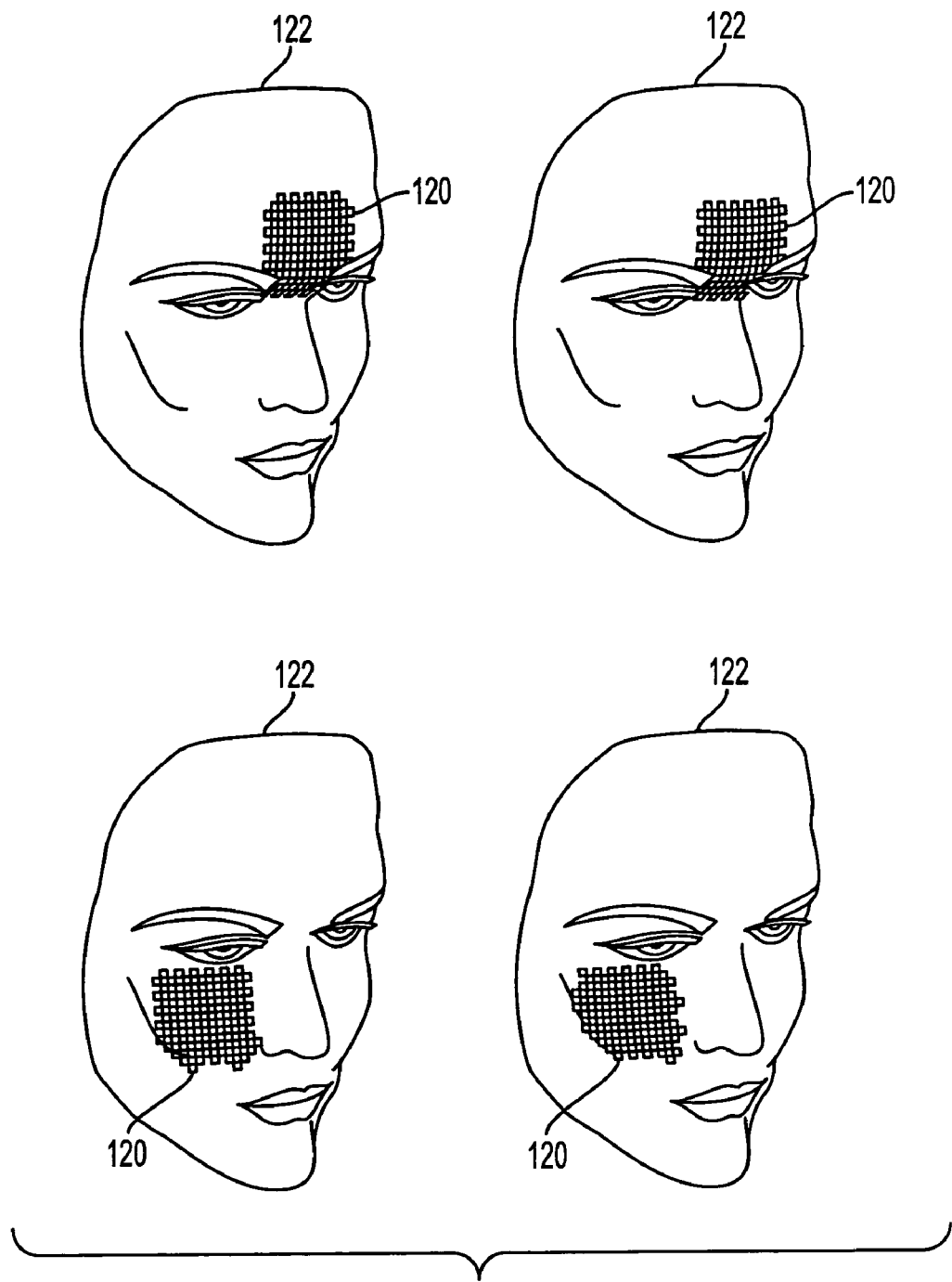
FIG. 2 shows frames of an animated rendering of a local parameterization 120 moving along the surface of a model 110/122.

FIG. 2 shows frames of an animated rendering of a local parameterization 120 moving along the surface of a model 110/122. One quality of the local texture wrapping of the moving patch of local parameterization 120 is how smoothly the final mapped rendering—according to the local parameterization—appears to change between individual increments of movement.

Smoothness

One technique of local parameterization could be to calculate a new single local parameterization for each incremental change in the area of interest or set of vertices being parameterized. That is to say, a new local parameterization is calculated each time a vertex (or polygon) is added or subtracted from the area being image-mapped, as happens when a brush moves along a surface. The technique of local image mapping changes a single parameterization (or creates a new one) each time the set of vertices being image-mapped changes. When the local portion of the mesh surface changes smoothly and continuously (e.g., a brush moves in sufficiently small increments), local parameterizations have not changed smoothly with the change in the portion of the surface being parameterized, but rather have changed abruptly with small changes in the parameterization.

Figure 3:
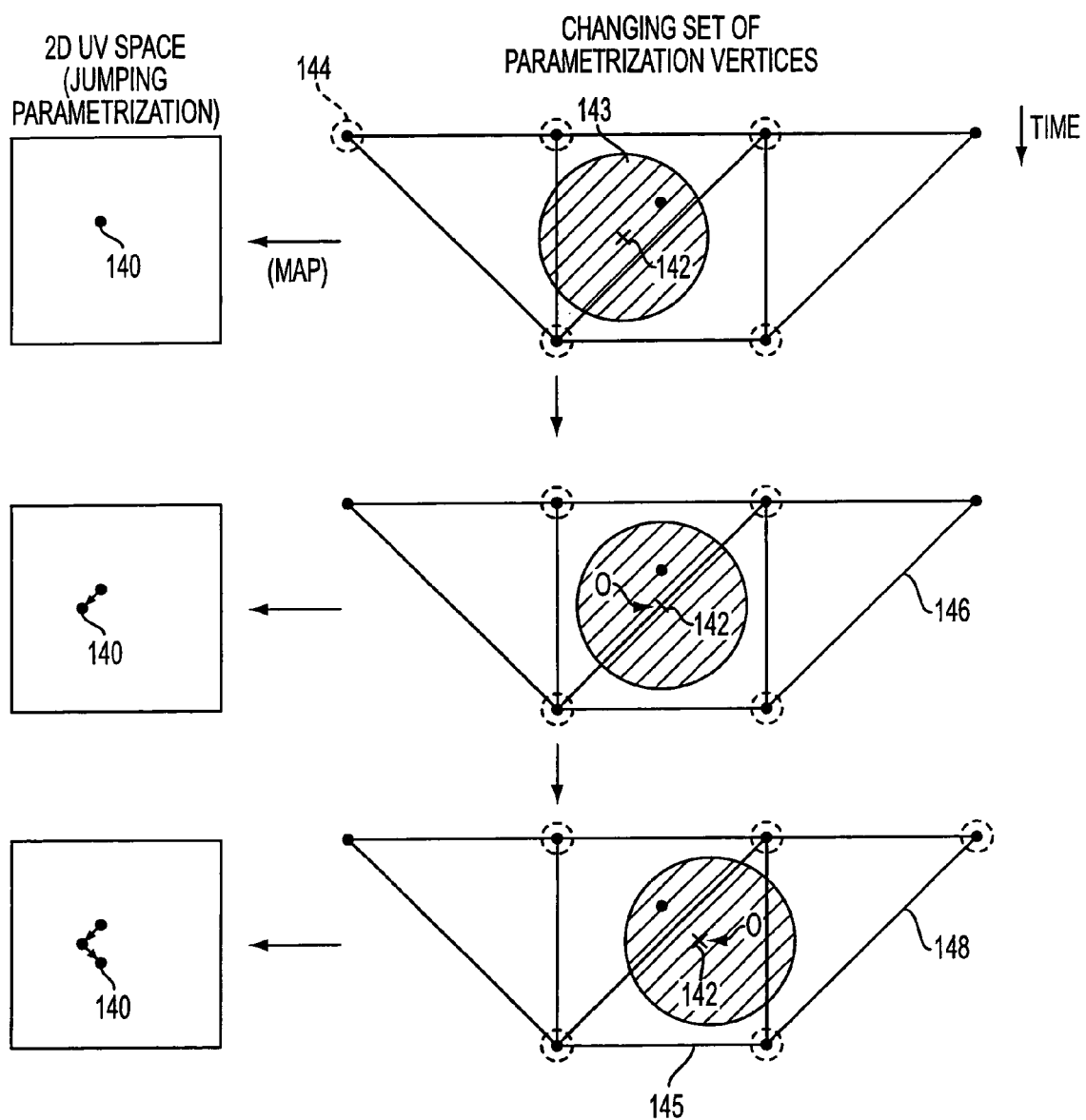
FIG. 3 shows en example of a mapping jumping as a local parameterization changes.

FIG. 3 shows en example of a mapping jumping as a local parameterization changes. The point 140 in UV space (left column) jumps each time the center 142 of the area 143 moves. Area 143 can be, for example, a paint stamp. As the area 143 moves, the set of vertices 144 (dashed circles) used for the current parameterization changes. Parameterization is a global operation, meaning that with each addition or subtraction of a parameterization vertex 144, the entire parameterization changes, even at vertices remote from where the vertex change occurred. Thus, as the area 143 moves across the mesh 145 from left to right, and as vertices 144 of the parameterization are subtracted (row 146), and added (row 148), the point 140 in UV space visibly jumps from one location to another.

Figure 4:
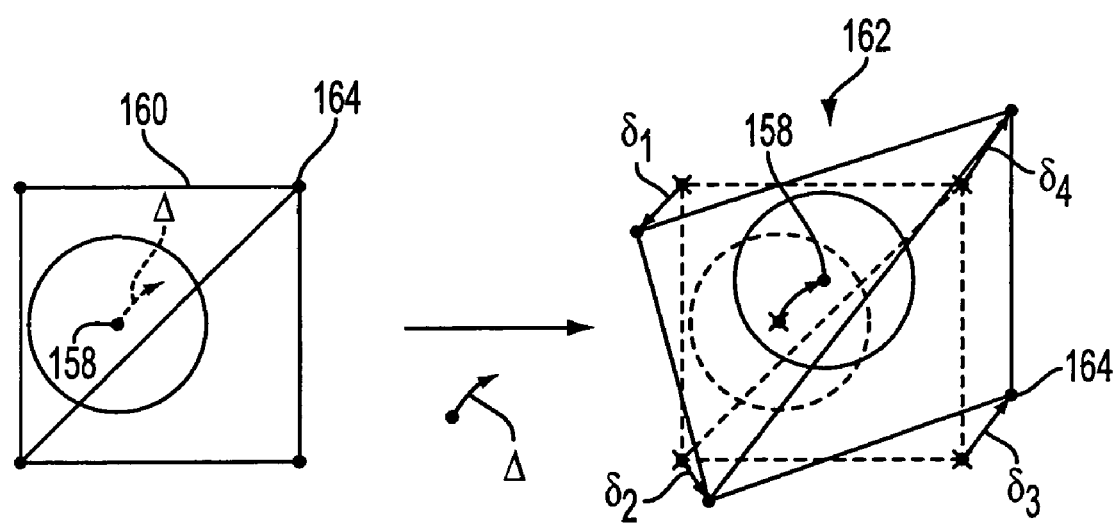
FIG. 4 shows a mapping that has changed as a result of a change in the domain being mapped.

FIG. 4 shows a mapping that has changed as a result of a change in the domain being mapped. A hit point 158 can be a point where a brush is located on a mesh surface. The hit point 158 in original mapping 160 changed by $\Delta$, and a next parameterization 162 changed in response. The vertices 164 moved by $\delta_{(1-4)}$.

With the present invention, as will become apparent with further discussion, $\forall \alpha, \exists D, (\Delta < D \rightarrow |\delta_i| < \alpha)$. In other words, for all values alpha, there exists a distance D, such that when delta is less than D, delta, is less than alpha. Put yet another way, with the present invention, as long as the hit point 158 does not move too fast (the increments of movement are sufficiently small), the parameterization will not change more than a small number determinable in advance. Under normal conditions, between successive rendered frames (e.g. FIG. 2), the same mapped point will not move more than 1 pixel, for example, while the patch moves over the surface. Jumps either do not occur are so small that they are hard to detect. The present invention is not limited to only this aspect and advantage, and others are discussed below.

General Embodiment

Figure 5:
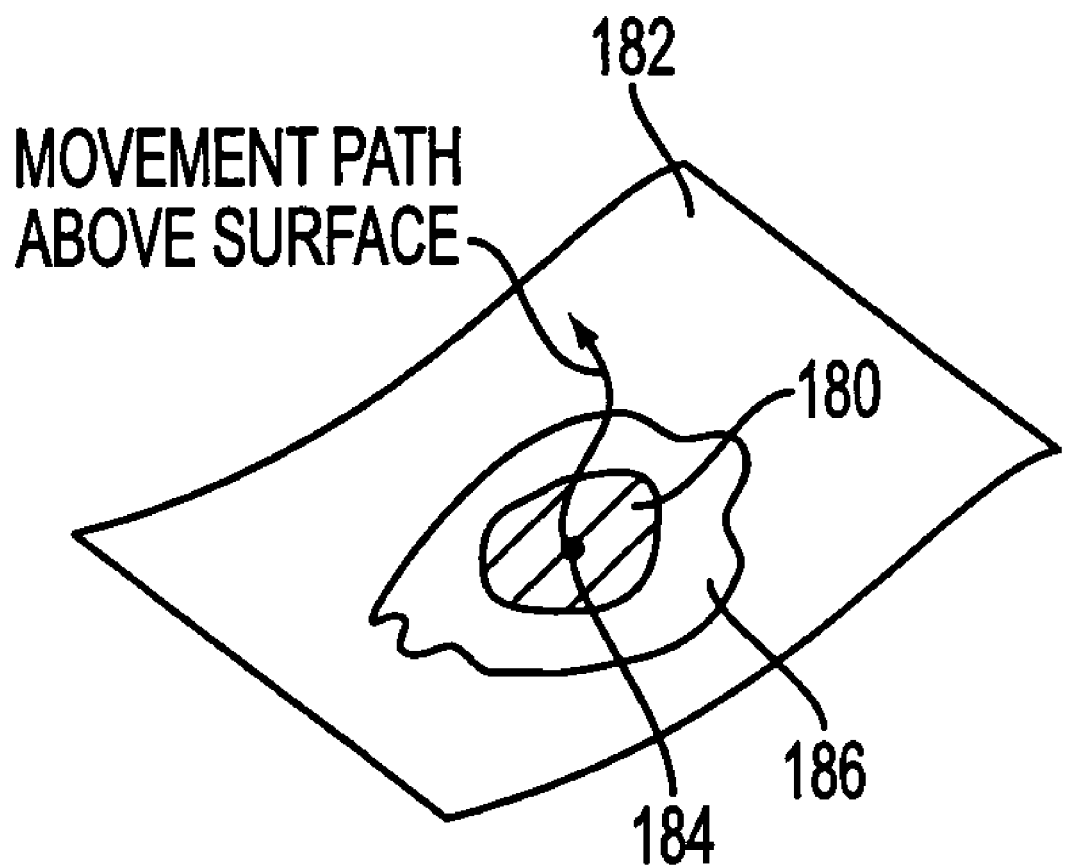
FIG. 5 shows an area of interest 180 on a surface mesh 182.

FIG. 5 shows an area of interest 180 on a surface mesh 182. The area of interest 180 is an area that may be used for performing a local operation such as painting, blurring or smearing, a local image mapping, etc. FIG. 5 also shows a hit point 158/184, possibly a brush or stamp center, for locating the area of interest 180 on the surface mesh 182. A parameterization neighborhood or area 186 tracks the area of interest 180.

Figure 6:
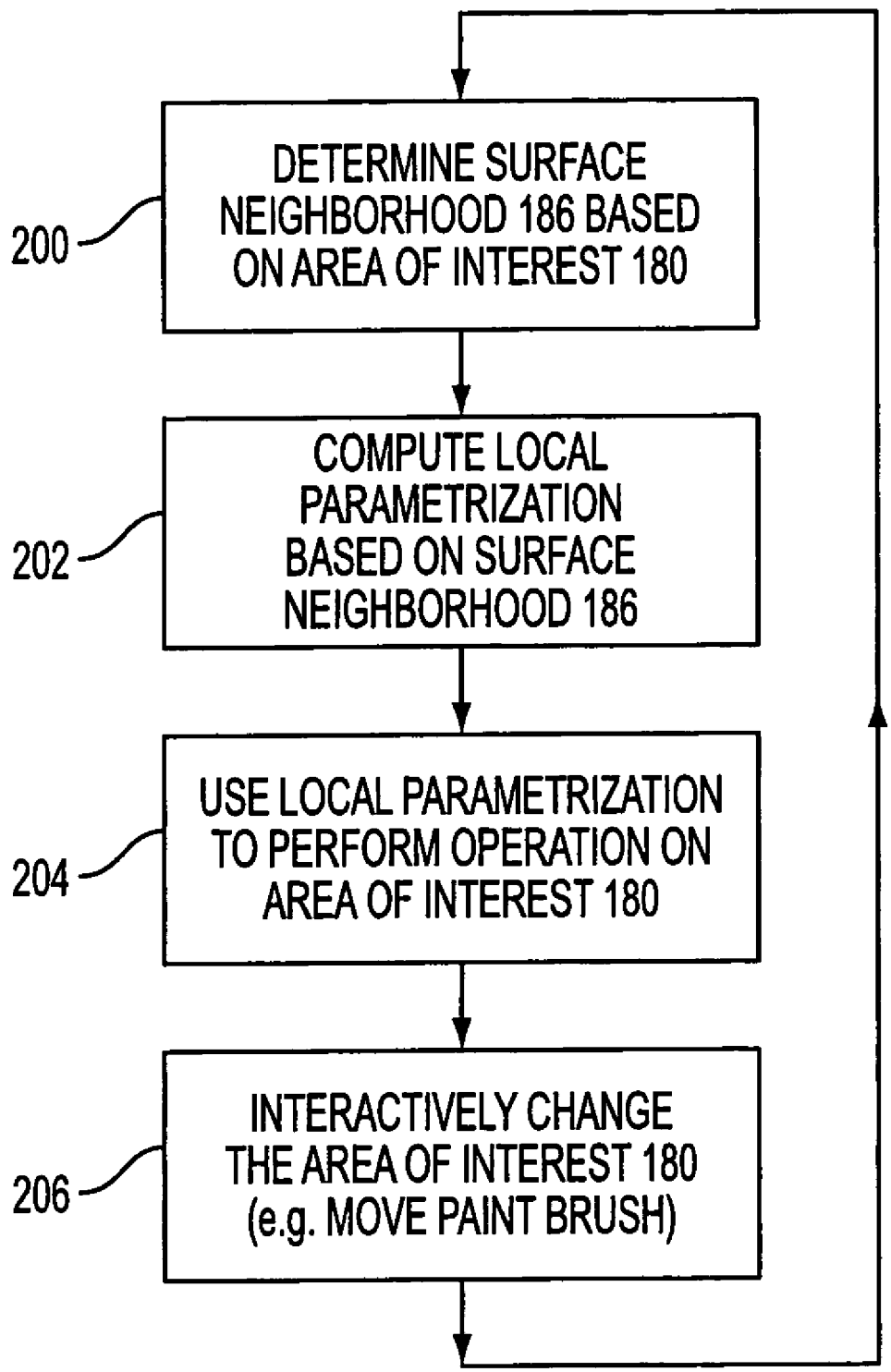
FIG. 6 shows a process of continuous local parameterization corresponding to FIG. 5.

FIG. 6 shows a process of continuous local parameterization corresponding to FIG. 5. Initially, parameterization area or surface neighborhood 186 is determined 200 based on the area of interest 180. The local parameterization is computed 202 based on the surface neighborhood 186. The local parameterization is used to perform 204 an image mapping or some operation on the area of interest 180. The area of interest 180 is then changed 206, possibly interactively, and the process may be repeated. Through one iteration (e.g., a mouse move event), the image mapped to the surface and displayed changes by no more than a small amount, and as the process repeats, the mapping of the area of interest 180 changes smoothly over time. The change 206 to the area of interest can be, for example, a deformation, a change in size, a change in location on the surface 182, a change in orientation, etc. A user interactively changing 206 the area of interest 180, for example moving the hit point 184 or area of interest 180 with an input device, will see the manipulated mapping render smoothly.

The present invention obviates the need to form a global parameterization of a surface by instead automatically finding a parameterization of a reasonably small portion of the surface; a local parameterization, as discussed in more detail later herein. This technique is simple and efficient, which makes it suitable for interactive applications. Furthermore, continuous changes in input parameters—like the changing location of a paintbrush on a surface—result in a local parameterization that also changes continuously and smoothly. Many applications of the technique are possible, some of which are discussed below, in particular, 3D painting and placement of 2D decals on 3D polygonal surfaces. The same technique can also be used to adapt 2D image processing tools to geometry filtering.

While the description herein generally discusses objects in three dimensions, the present invention is equally applicable to n-dimensional surfaces (where n is any integer). For example, an animated object can be considered as a four dimensional surface (x, y, z, time). All of the concepts described herein can be applied to any number of dimensions using conventional methods such as differential geometry. Therefore, the terms "model" and "surface", although discussed with reference to 3D models or surfaces, also are defined to include n-dimensional models or surfaces.

Finding a Surface Neighborhood

Figure 7:
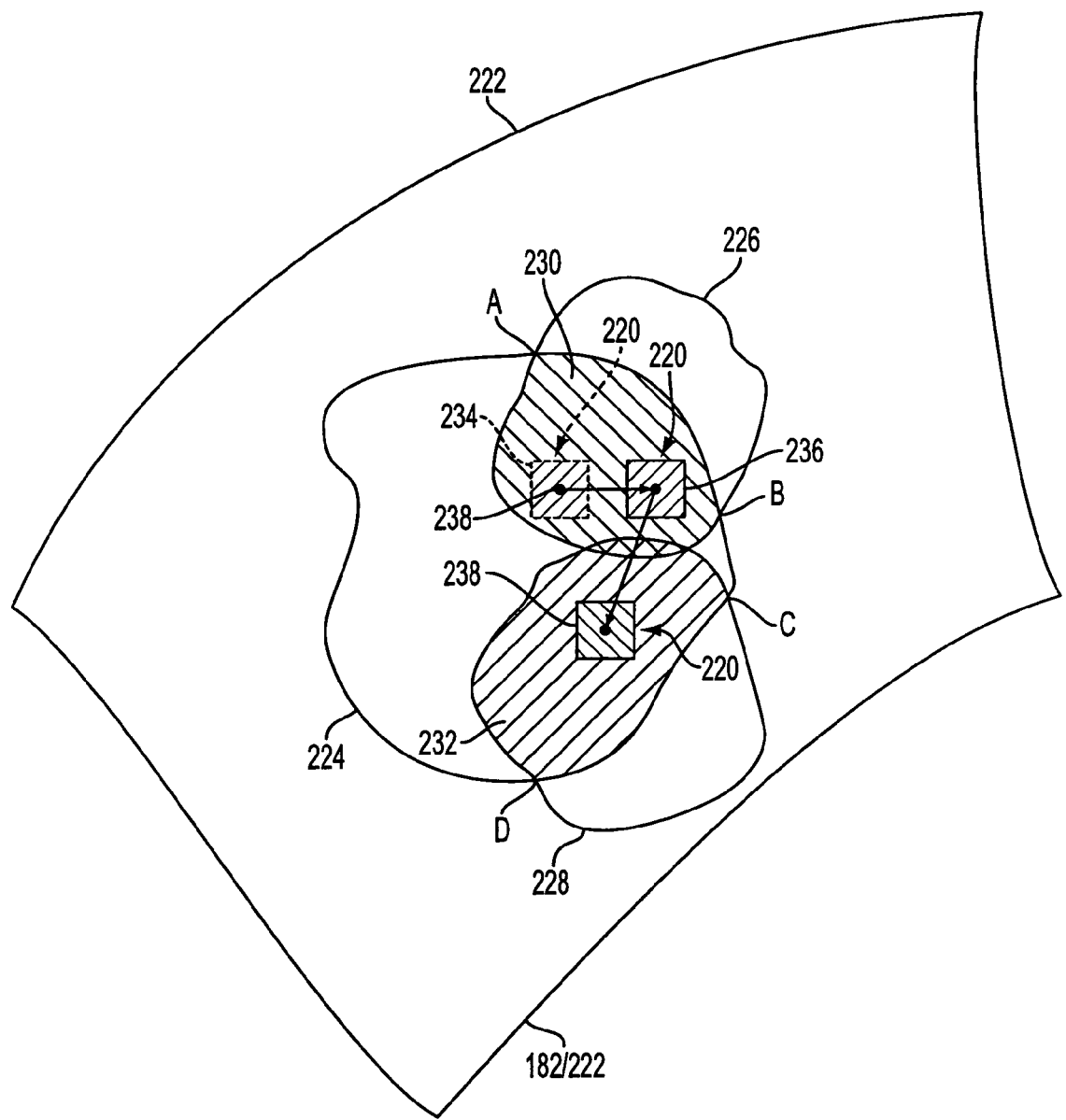
FIG. 7 shows an area of interest 220 on a surface 182/222.

FIG. 7 shows an area of interest 220 on a surface 182/222. FIG. 7 also shows three sub-neighborhoods 224, 226, 228, of vertices of surface 222. Sub-neighborhood 224 and sub-neighborhood 226 mutually form a first intersection or overlap area 230 (the shaded area encompassed by the two arcs between points A and B). Sub-neighborhood 224 and sub-neighborhood 228 mutually form a second intersection or overlap area 232 (the shaded area encompassed by the two arcs between points C and D). The area of interest 220 is shown to move from an initial position 234 in the first overlap area 230, to a second position 236 in the first overlap area 230, and then to a third position 238 in the second overlap area 232. Two sub-neighborhoods are the minimum number of sub-neighborhoods needed, however, as explained below with reference to FIG. 10, three or more sub-neighborhoods are preferably used at any given time to define the local neighborhood and the current overlap area.

Figure 8:
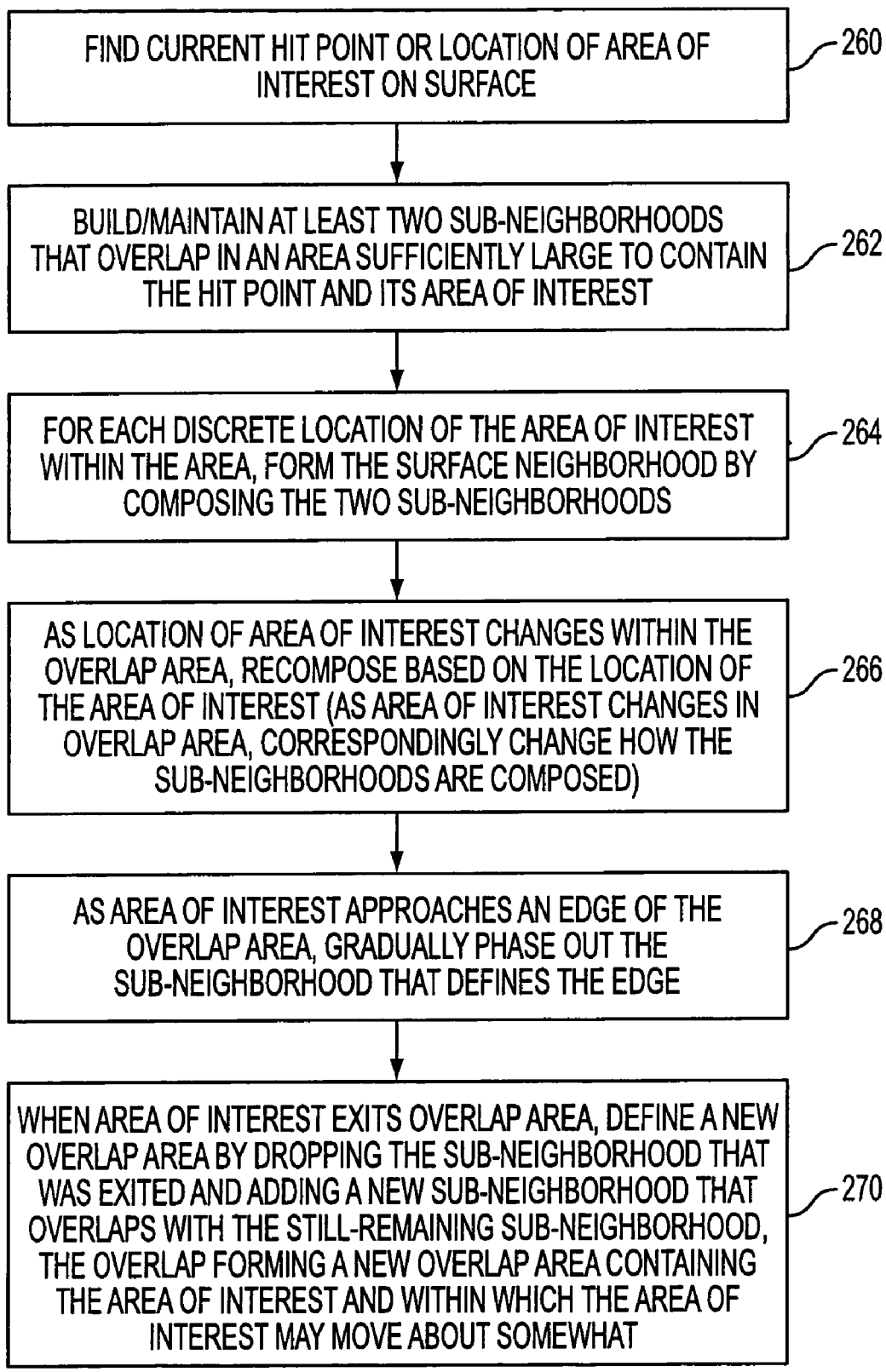
FIG. 8 shows a process for defining a surface neighborhood according to a changing area of interest 220.

FIG. 8 shows a process for defining a surface neighborhood according to a changing area of interest 220. First, the current hit point 184 or location of area of interest 220 on the surface 222 is found 260. At least two sub-neighborhoods 224,226 that intersect or overlap in an area 230 sufficiently large to contain the hit point 184 and its area of interest 220 are built or maintained 262. As discussed below with reference to FIG. 10, three or more sub-neighborhoods are preferable, however any combination of at least two or more is equally valid.

For each discrete location of the area of interest 220 within the area 230, the surface neighborhood is formed 264 by composing the two sub-neighborhoods 224,226. The surface neighborhood can be used to designate a local parameterization as discussed in more detail later herein. As the location of area of the interest 220 changes or moves within the overlap area 230, the surface neighborhood is reformed by recomposing 266 the pre-existing sub-neighborhoods 224, 226. The recomposing is based on the location of the area of interest 220, and as area of interest 220 changes in the overlap area 230, the composing of the sub-neighborhoods 224,226 changes correspondingly. Preferably, the closer the area of interest 220 is to the edge of a sub-neighborhood of the overlap area 230, the less contribution or weight that sub-neighborhood has in the composing. This facilitates the smooth phasing-in and phasing-out 268 of sub-neighborhoods 224,226 that contribute to the surface neighborhood.

When the area of interest 220 exits the overlap area 230, a new overlap 232 containing the area of interest 220 is defined 270 by dropping the sub-neighborhood 226 that was exited and adding to the surface neighborhood a new sub-neighborhood 228 that overlaps with the still-remaining sub-neighborhood(s) 224. The new overlap 232 contains the area of interest 220, and the area of interest 220 may move about somewhat within the intersection or overlap 232.

Figure 9:
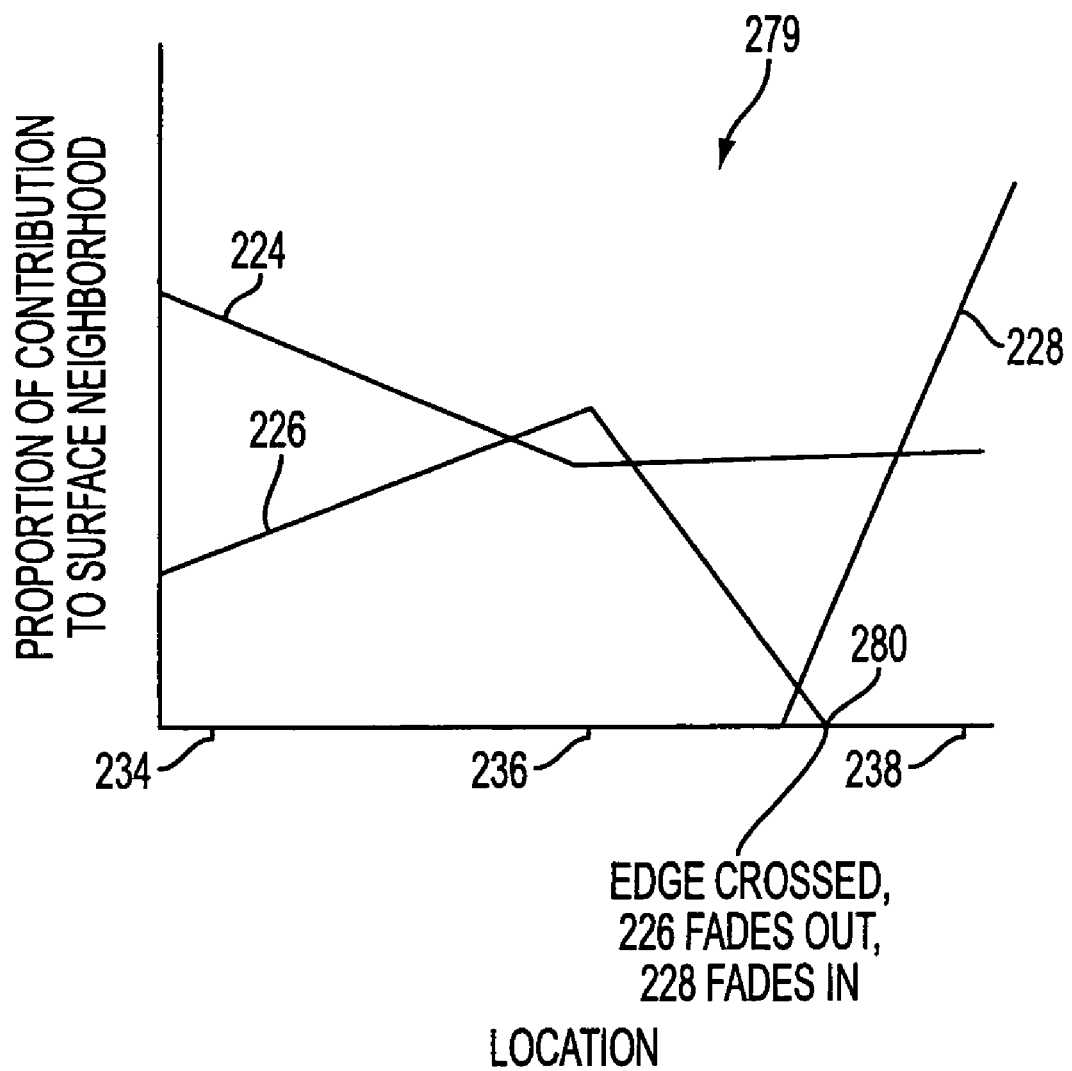
FIG. 9 shows a graph 279 of the relative contributions of the sub-neighborhoods 224, 226, 228

FIG. 9 shows a graph 279 of how the relative contributions of the sub-neighborhoods 224, 226, 228 in FIG. 7 change as the area of interest 220 changes or moves 266 and the neighborhoods are recomposed. The area of interest 220, for example a brush with center 238, is initially at position 234. The surface neighborhood is comprised of sub-neighborhoods 224 and 226, which together form the first overlap patch 230. As long as the area of interest 220 stays within a given overlap area, the surface neighborhood does not change. As the area of interest 220 moves from location 234 to location 236, it moves toward the edge of sub-neighborhood 224, and so the sub-neighborhood 224 is given less weight. As the area of interest 220 moves from location 236 to location 238, the contribution of sub-neighborhood 226 decreases until, at point 280, sub-neighborhood 226 is exited and it no longer contributes to the surface neighborhood. As the area of interest moves into sub-neighborhood 228, it fades in as a new part of the surface neighborhood. The area of interest 220 may now vary in location, size, shape, etc. within the second overlap patch 232, and only sub-neighborhoods 224 and 228 are needed to build a surface neighborhood, sub-neighborhood 224 is re-used, without being re-calculated. The relative contributions of the sub-neighborhoods to the surface neighborhood will vary according to or responsive to changes to the area of interest 220. As discussed below, this smooth re-weighting or adding/subtracting of sub-neighborhoods can be accomplished using barycentric coordinates of hit point 184.

A surface neighborhood is a composition of weighted sub-neighborhoods of vertices. In the case of on-the-fly dynamic image mapping of a changing 2D space (e.g. a moving or expanding/shrinking brush area), the surface neighborhood may be used to generate a local parameterization. A sub-parameterization is calculated for each sub-neighborhood, and those sub-parameterizations are weighted and combined to form the local parameterization. The sub-parameterizations may be combined by weighted interpolation or weighted averaging. The weights can be negative. Within a given region of the surface (an overlap patch), the brush may move about and change and no new parameterizations need to be calculated; all that is needed is a reaveraging or reinterpolation of the sub-parameterizations. According to each brush change within the patch, the sub-parameterizations are re-weighted according to the change and then recombined (e.g. by re-interpolating). Thus, as long as the weights vary smoothly, the local parameterization changes smoothly as the area of interest changes within the overlap, and parameterizations do not have to be calculated with each incremental movement of the area of interest.

It is also possible to ensure that the local parameterization changes smoothly even as the overlap patch changes, by choosing the weights so that each sub-parameterization is added with the corresponding weight starting at or near zero and similarly the weight ending at or approaching zero when it is dropped. Many weight definitions are possible. As long as the smoothness and boundary conditions are met, the resulting parameterization will vary smoothly.

Figure 10:
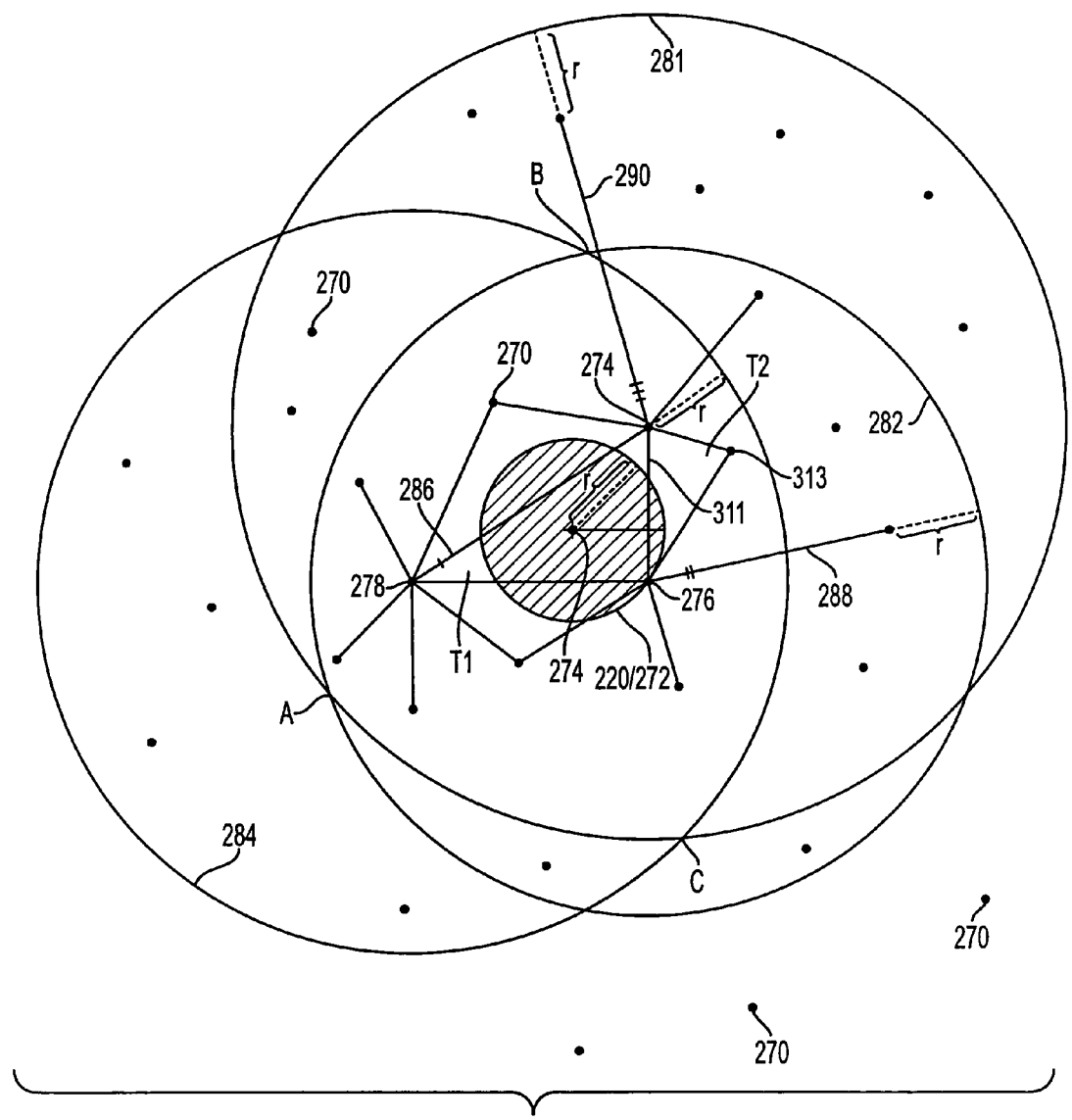
FIG. 10 shows a surface neighborhood and its sub-neighborhoods defined by using edges of the surface mesh.

In practice, the vertices and edges of the surface are used to define the surface neighborhood. FIG. 10 shows a surface neighborhood and its sub-neighborhoods defined by using edges of the surface mesh. All of the points 270 are vertices of the 3D surface mesh. For clarity, not all edges of the surface are shown, and not all vertices 270 are labeled. The overlap patch is area 272 (shaded area defined by arcs AB, BC, and AC). The area of interest 220 is the brush circle 272 having location or hit point 274 (the center of the brush circle 272). The brush circle 272 has radius r. The brush center 272 is within surface triangle T1, defined by edges connecting vertices 274, 276, and 278. Circles 281, 282, and 284 define the sub-neighborhoods, and are centered on vertices 274, 276, and 278, respectively. Surface edges 286 (single hash mark), 288 (double hash mark), and 290 (triple hash mark) are the longest edges connected to vertices 274, 276, and 278, respectively.

The sub-neighborhood definitions and arrangements discussed above are only one possibility. The sub-neighborhoods can be validly defined in other ways differently. Ideally, the sub-neighborhoods will depend on the current hit point, the weights of the sub-neighborhoods will vary smoothly at boundaries, and the intersection of all of the sub-neighborhoods substantially covers the whole neighborhood of all hit points influenced by them.

Figure 11:
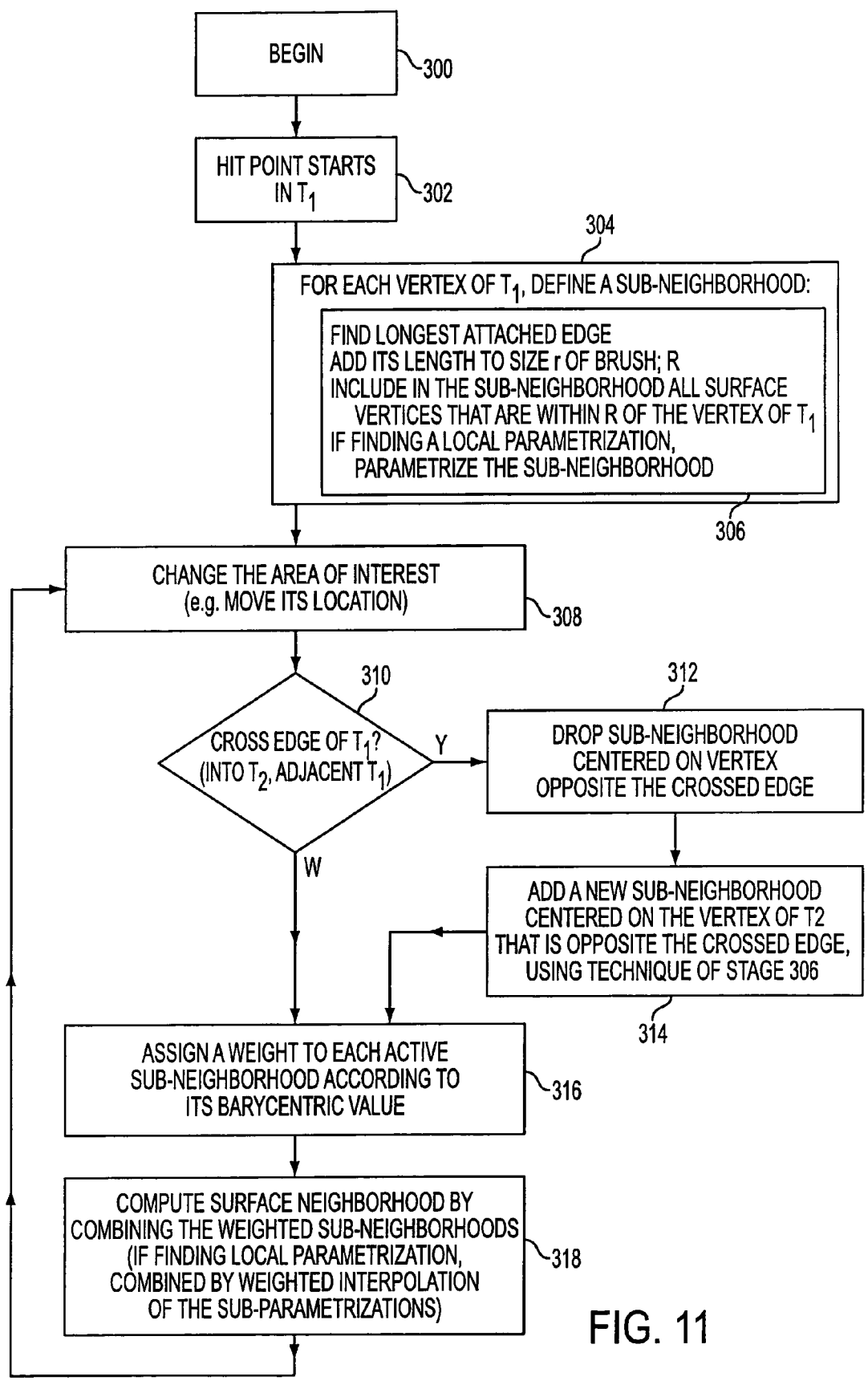
FIG. 11 shows a process for generating and using the surface neighborhood and sub-neighborhoods shown in FIG. 10.

FIG. 11 shows a process for generating and using the surface neighborhood and sub-neighborhoods shown in FIG. 10. At initialization 300, all sub-neighborhoods are preferably computed at once, after which they are only added or removed as needed. The process begins 300 with initial placement 302 of the hit point 274 of the area of interest 220 (brush circle 272) in triangle T1 comprised of vertices 274, 276, and 278. For each 304 vertex 274, 276, 278 of T1, a sub-neighborhood centered on the vertex is defined 306 by: finding its longest attached edge, adding its length to size r of brush circle 272 to get R, including in the sub-neighborhood all surface vertices that are within R of the vertex of T1, and if the local parameterization is being computed, then also parameterizing the vertices included in the sub-neighborhood.

The area of interest 220 or brush circle 272 is now changed 308 by, for example, moving it relative to the polygon surface, for example by moving the hit point/brush center 274. If the hit point 274 crosses 310 an edge 311, of T1 (thus moving into adjacent triangle T2), then the sub-neighborhood centered on the vertex 278 opposite the crossed edge 311 is dropped 312, and a new sub-neighborhood centered on the vertex 278 of T2 that is opposite the crossed edge 311 is constructed and added 314 using the algorithm of stage 306. After the hit point 274 either moves within the triangle T1, or after new triangle T2 is entered 310, a weight is assigned 316 to each active sub-neighborhood according to its barycentric value. Then, the surface neighborhood is computed 318 by combining the weighted sub-neighborhoods (if finding the local parameterization, then the parameterizations (i.e., sub-parameterizations) found at stage 306 are combined by weighted interpolation). Continuous movement or change of the brush circle 272 (and corresponding change to the neighborhood) is achieved by returning to stage 308 to process the incremental changes to the brush circle 272.

With the process described above, it can be shown that as long as the brush circle or area of interest 272 moves within the triangle T1, then the surface neighborhood generally covers all possible positions. Only the weights change, and no other sub-neighborhoods or sub-parameterizations are needed. Furthermore, the surface neighborhood re-defined when new triangle T2 is entered has the same type of coverage while re-using two of the three previously calculated sub-neighborhoods (those corresponding to vertices 274 and 276). Other approaches may be used. For example, smoother methods where additional vertices are taken into account could be achieved by adding all vertices directly connected to T1. Context-sensitive sub-neighborhoods and weighting methods may also be used.

Figure 12:
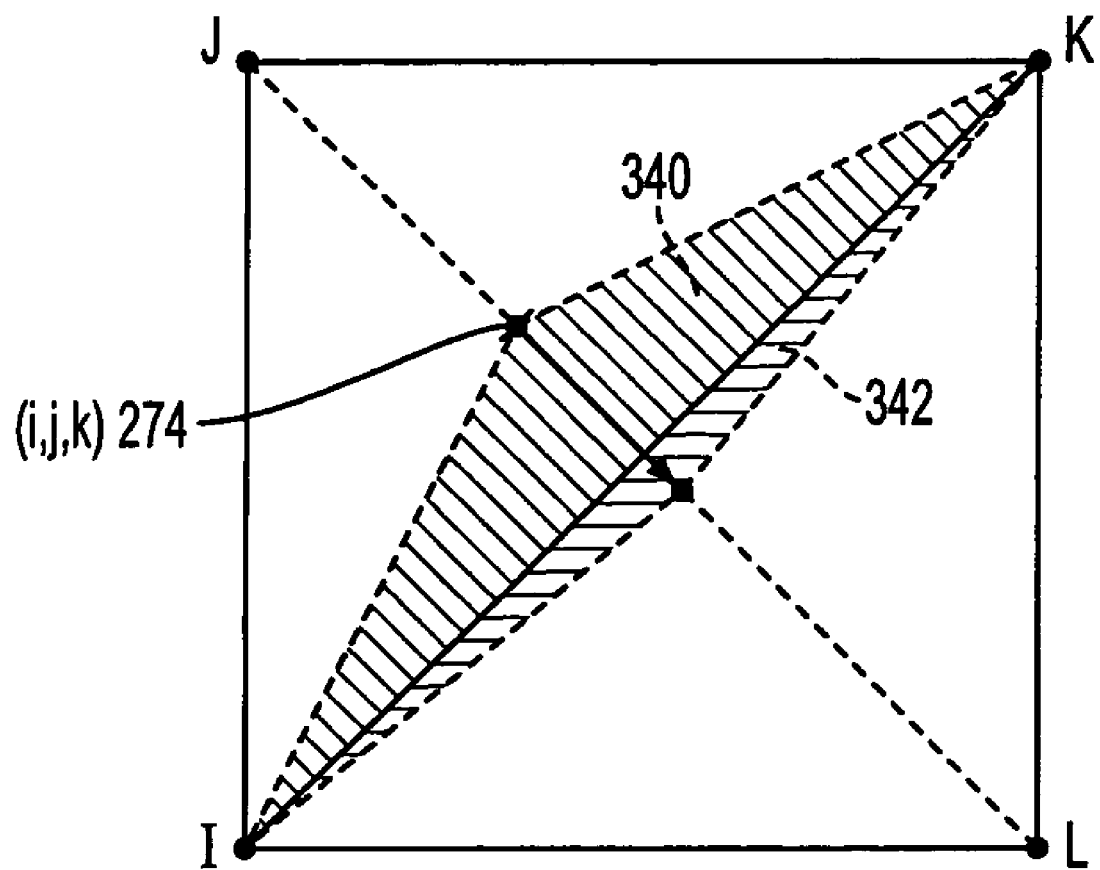
FIG. 12 shows how barycentric coordinates are used.

FIG. 12 shows how barycentric coordinates are used. Points I, J, K, and L are vertices on a surface. The hit point 274 is initially in triangle I, J, K. The barycentric coordinate of hit point 274 is (i,j,k), where: i is the area of the triangle formed by points J, K, 274; j is the area of triangle 340 (shaded) formed by points I,K,274; and k is the area of triangle formed by points I,J,274. The weight assigned 316 to the sub-neighborhoods of vertices I,J,K are barycentric values i,j, and k, respectively. It can be seen that as the hit point 274 approaches edge IK, the weight j (and thus the relative contribution of J's sub-neighborhood) approaches 0. Furthermore, as hit point 274 crosses into triangle I,K,L, the weight associated with vertex L (the area of shaded triangle 342) will initially be at or near 0 and will increase as the hit point 274 recedes from the edge IK. Thus, sub-neighborhoods or sub-parameterizations combined with these weights are smoothly merged in and merged out. Weighted averaging is one way in which sub-neighborhoods or sub-parameterizations may be combined or composed.

Figure 13:
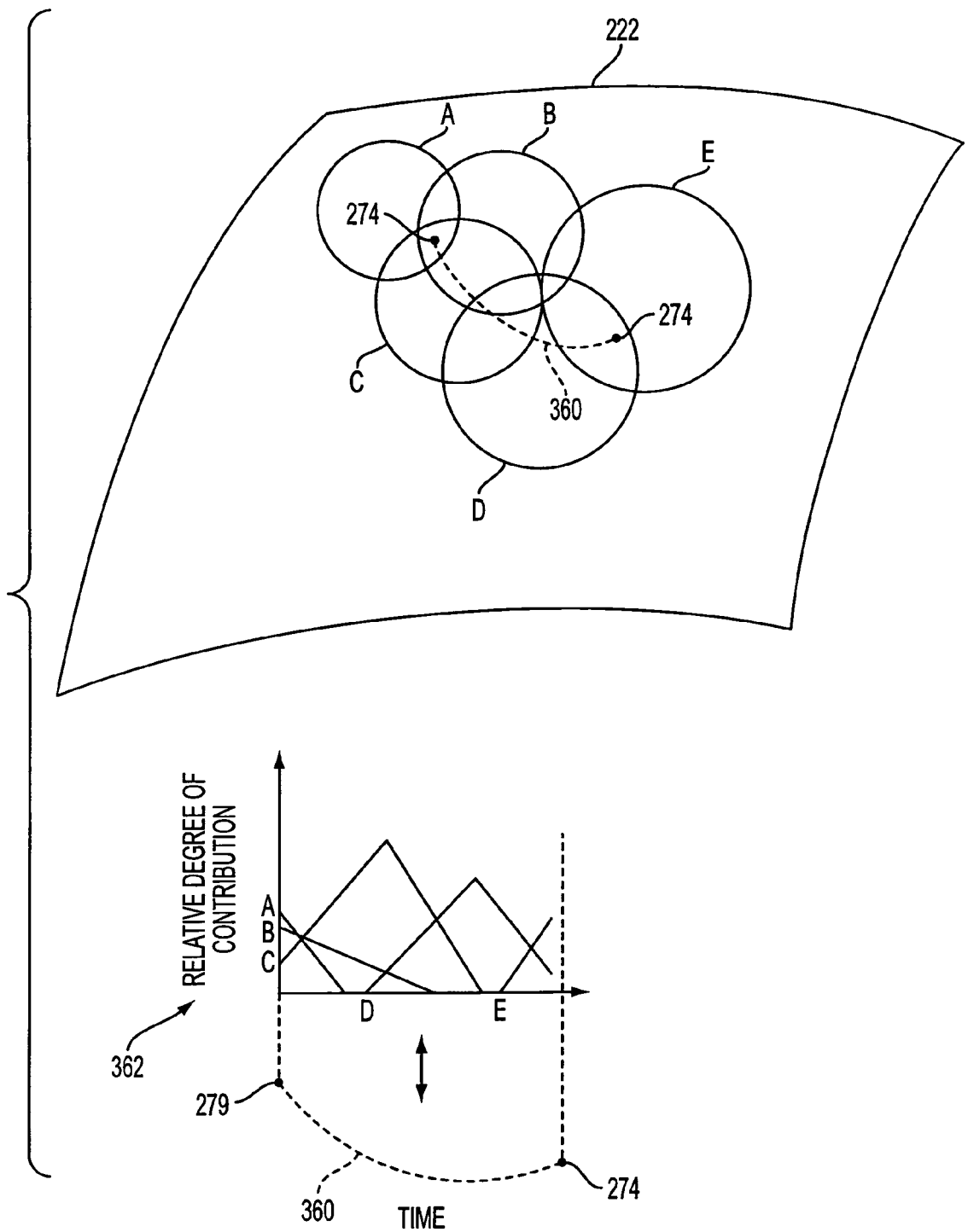
FIG. 13 shows how sub-neighborhoods can fade in and fade out as a hit point 274 moves on surface 222 along path 360.

FIG. 13 shows how sub-neighborhoods can fade in and fade out as a hit point 274 moves on surface 222 along path 360. The following explanation mentions two current sub-neighborhoods being used, however two or more may be used, and preferably three or more are used.

Graph 362 shows how the relative degree of contribution of sub-neighborhoods A–E vary as the hit point 274 moves on the path 360. Not all of the sub-neighborhoods A–E need to exist at all times; they may be created or dropped as necessary. Only two or more (preferably three) are actually needed at any given time. For example, the combinations that may be used over time as the hit point 274 moves on path 360 might be A+B, then B+C, then C+D, and then D+E. Although entry and exit are shown as occurring when the hit point 274 crosses a sub-neighborhood boundary, it is also possible to add or remove a sub-neighborhood in response to some part of the area of interest moving across the edge of the sub-neighborhood. Other sub-neighborhood thresholds may be used. This may also be approximated by the triangle-edge test 310, discussed above with reference to FIG. 11.

It can be seen that an advantage of this approach is that compute-intensive parameterizations are computed infrequently compared to the number of discrete positions of the area of interest. Most of the time, a change in brush position requires only a re-weighting and recombining of the already-calculated sub-parameterizations. Furthermore, according to the current area of interest (or changes thereto), it may be advantageous to cache sub-neighborhoods or sub-parameterizations that are no longer necessary, or that may be expected to be necessary. A look-ahead or extrapolation technique may be used to anticipate and prepare sub-neighborhoods (perhaps concurrently) before they are needed in the local neighborhood. For example, if initially hit point 274 is using only sub-neighborhoods A and B, but it can be seen by the trend of movement that a sub-neighborhood such as sub-neighborhood C will soon be necessary, then sub-neighborhood C can be prepared before it is actually used.

Figure 14:
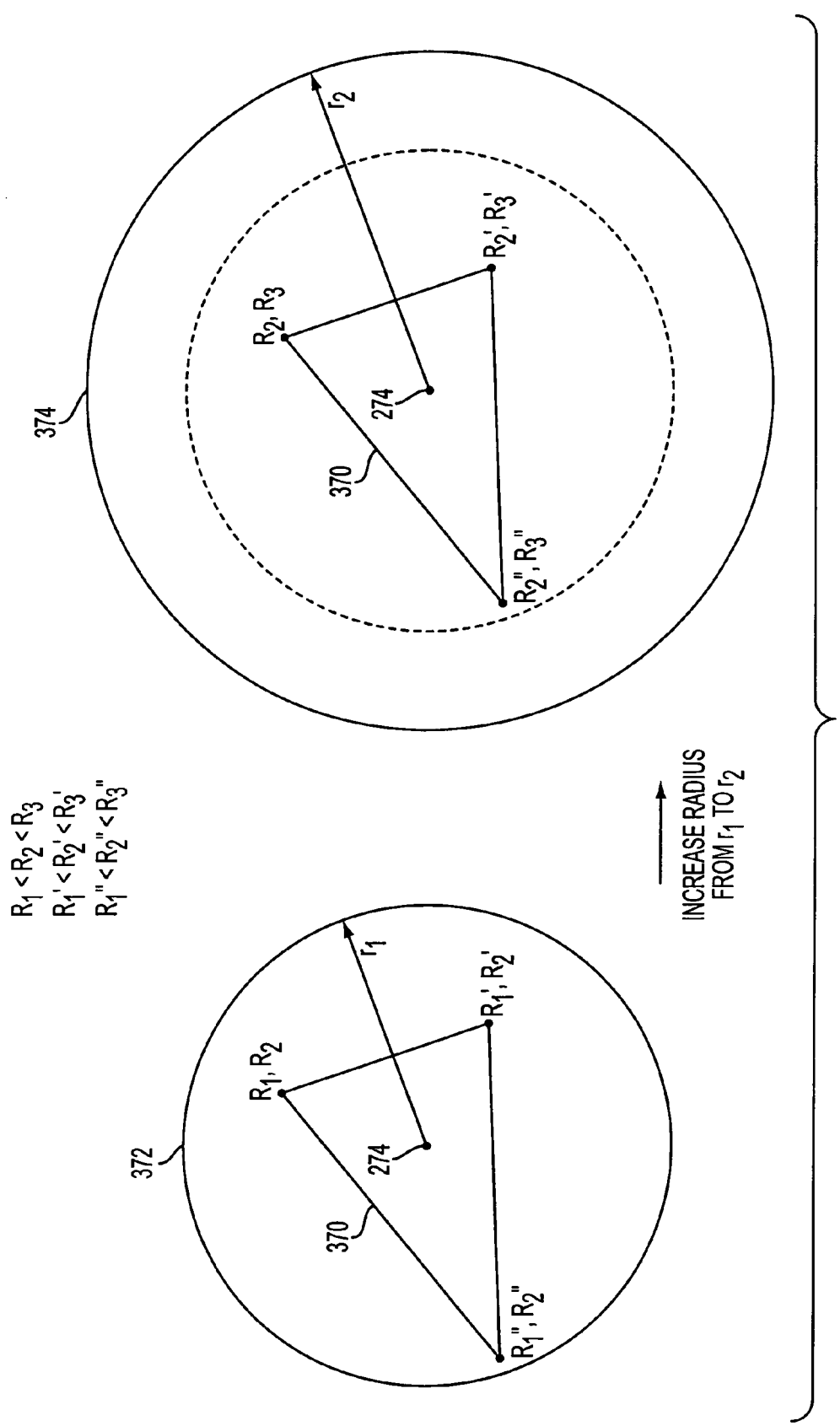
FIG. 14 shows the use of 6 local sub-neighborhoods to cover an expanding area of interest.

FIG. 14 shows the use of 6 local sub-neighborhoods to cover an expanding area of interest. For example, an area of interest can expand in reaction to a dynamically changing a brush size, or scaling a decal on the surface. Therefore, when expansion occurs or is expected to occur, it is preferable to determine two or more local neighborhoods, with different sizes, around each vertex of the current surface triangle that contains the hit point. In FIG. 14, triangle 370 contains hit point 274. Initially 372, the size of the area of interest, e.g. the brush size, is radius $r_1$. The 6 radii $R_1$ through $R_2''$ are set such that the overlap of their 6 circles (which define 6 sub-neighborhoods of vertices) contains the area of interest and $R_2 > R_1$, $R_2' > R_1'$, and $R_2'' > R_1''$. The radius $r_1$ is expanded to $r_2$, for example in response to a user applying pressure to a stylus. After 374 the expansion, if the area of interest is no longer contained within the larger circles of radii $R_2$, $R_2'$, and $R_2''$, then the circles of radii $R_1$, $R_1'$, and $R_1''$ are dropped from the local neighborhood, and new sub-neighborhoods defined by new circles with radii $R_3$, $R_3'$, and $R_3''$ are added to the local neighborhood, where $R_3 > R_2$, $R_3' > R_2'$, and $R_3'' > R_2''$. This provides a piecewise linear response to the user defined expansion parameter. A smoother response can be achieved by using more than two radii per triangle vertex.

Using this technique, and using barycentric weighted interpolation or averaging of the local sub-neighborhoods, a smooth and continuous expanding local neighborhood may be defined. As the area of interest expands towards the outer boundary of the local neighborhood, the smaller or inner sub-neighborhoods receive less weight. Although any type of discretization will work, the size of the radii of the sub-neighborhoods is preferably based on an average edge length. The radii of the sub-neighborhoods are preferably increased as a ratio of the radius of the area of interest. For example, radius R3 could be set to be $(k*(R_2+r_2/4))$, where k is a constant based on or proportional to an average edge length of the polygon mesh, or some subset of edges in or around the local neighborhood. The same process is applied in reverse when the area of interest decreases. Furthermore, the brush or area of interest need not be circular, but the local neighborhood may be determined based on the smallest circle or radius that contains the brush.

Although barycentric weighting is preferable, other methods of weighting may also be used. For example, piece-wise linear approximation in general will lead to smooth changes. Higher order approximations may also be used.

Because the technique of using 6 sub-neighborhoods requires twice the computation as the 3 sub-neighborhood approach, it is preferable that the 6 sub-neighborhood feature may be disabled or turned off. This is particularly true when the area of interest or the brush size does not change. The disabling may be automatically triggered, for example by detecting lack of change in the size of the brush, or the disabling may be manually triggered.

Determining Vertices/Triangles "Touched" by a Brush

Because the exact part of the model that will be covered by or mapped to the 2D domain is not known until the local neighborhood is determined, the points of the surface that will be covered by the mapping or parameterization are first determined. Several approaches may be used to approximate the vertices or triangles in the area of contact between the brush and the surface before running the parameterization that will precisely map the 2D domain to the local area of the surface mesh.

One approach is to take a projection of the 2D domain (e.g. the brush shape) along the normal of the current triangle or the current hit point. Only those vertices (or triangles, or polygons) that intersect the projection are included in the area of interest. The projection will reduce the size of the intersected triangles, and the parameterization process will tend to expand the 2D domain, which will generally ensure that the whole stamp footprint will be covered by the local neighborhood. This approach tends to produce local neighborhoods that are larger than necessary. Another approach is to discard points whose Euclidean distance from the hit point in 3D space is greater than the size of the brush. The distance along the surface will be greater than the straight line Euclidean distance, and the parameterization process will increase the corresponding distance in the 2D or UV space, thus providing a full coverage of the stamp. Another approach, useful with intricate surfaces or thin objects is to measure the distance along the surface. This can be expensive to compute in real time, and may be approximated by using edge distances on the surface, preferably by traversing outward from the brush center. The approximated surface edge distance will be greater than the true surface distance, and therefore it is preferable to provide a global tolerance factor by multiplying the brush size by the tolerance factor, which will reduce the size of the area of interest on the surface. It is also possible to refine the actual neighborhood by starting with a candidate neighborhood, and repeatedly defining the corresponding local parameterization (see below), then adding triangles which may be missing, removing the ones that are completely outside of the area of focus in two dimensions. In practice, one or two iterations are sufficient to get a satisfactory result.

Deriving a Local Parameterization from a Surface Neighborhood

As discussed above, the continuously and smoothly changing surface neighborhood (defined by its sub-neighborhoods) can be used to compute a smoothly changing continuous local parameterization. Each sub-neighborhood is parameterized, and those sub-parameterizations are used to derive a local parameterization. Although methods of parameterizing a polygon mesh surface are known, it is preferable to use the parameterization technique described in "Least Squares Conformal Maps for Automatic Texture Atlas Generation", by Jerome Maillot published in SIGGRAPH 02 Conference Proceedings, pages 362–371, ACM Press, 2002, which is incorporated by reference herein. This parameterization technique is preferred for computing on-the-fly parameterizations for its speed and numerical stability.

The parameterizations should also be translated, rotated, and scaled to ensure the best match of the current triangle. This is best accomplished using a least square minimization. Fitting the orientations avoids UV shrinking that might otherwise be introduced during the interpolation. Furthermore, in a preferred embodiment, only the vertices are parameterized; points in between are interpolated. Additionally, the sub-parameterizations are translated so that the hit point always matches a specific location in UV space, generally the image center. Each vertex may also contain a desired direction for the U axis. This vector can be manually defined, or may be computed as a cross product of the normal and a fixed direction. The three rotation angles necessary to align the U axis with each direction are computed, and the final rotation is computed using the barycentric interpolation of those three angles.

Filling Gaps, Adding Edges, and Building Seams

Figure 15:
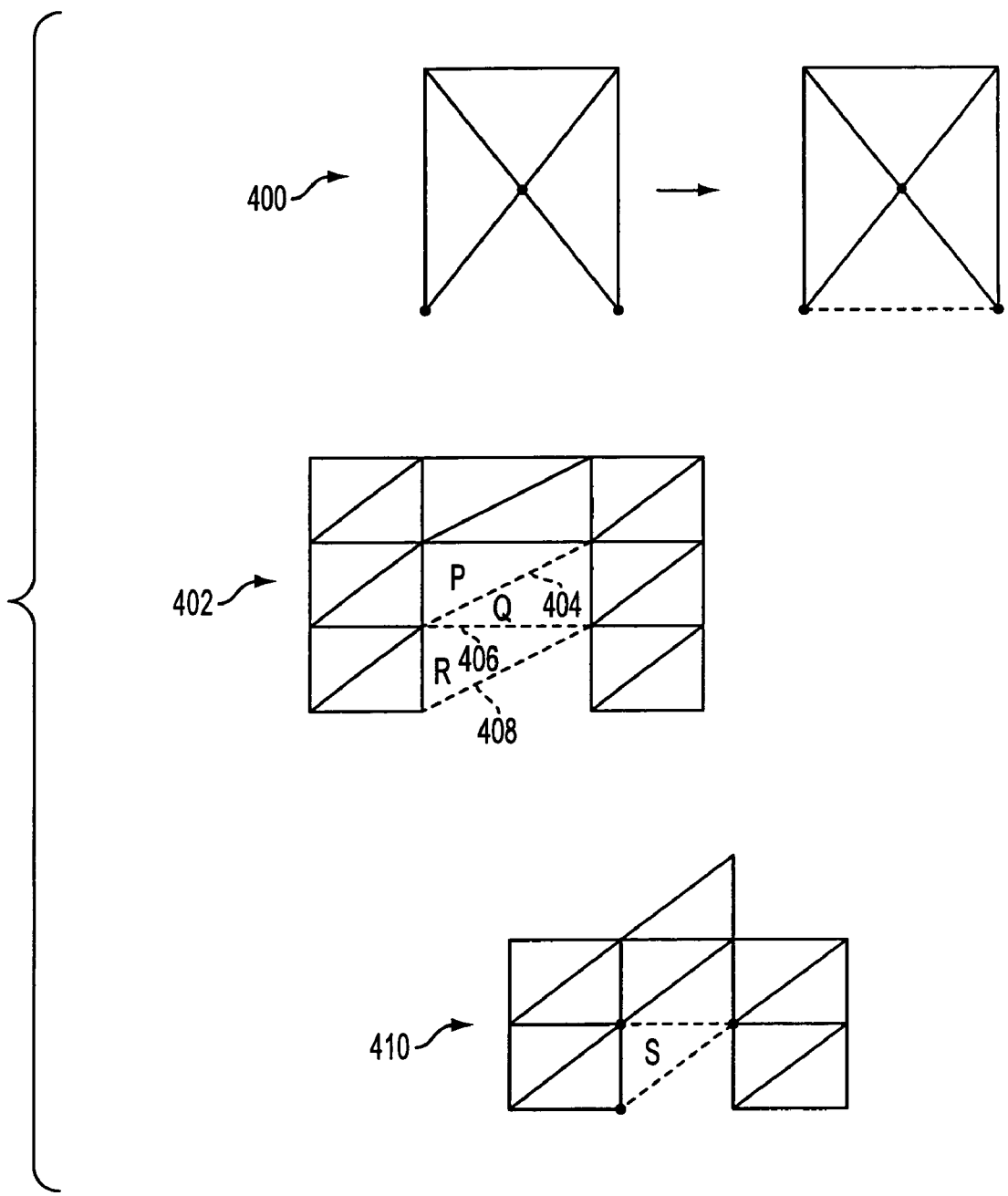
FIG. 15 shows scenarios to be handled when building an area of interest that will determine the surface neighborhood.

FIG. 15 shows scenarios to be handled when building an area of interest (e.g., brush stamp) that will determine the surface neighborhood. When determining the area of interest, a search of the whole 3D object may be avoided by traversing the model or geometry starting from the current triangle containing the hit point. Vertex connectivity information is used, and traversal or propagation stops at the triangles outside the area of interest. In case 400, when the points of an edge are already included in the local neighborhood, there is not a problem with adding a new edge to the existing neighborhood. In case 402, where there is a gap in the growing area of interest, triangles P, Q, and R are added in the given order by adding edges 404, 406, and 408 in the given order. A different order is prevented by detecting or prohibiting the addition of a new triangle with two new triangle edges where the three vertices of the triangle have already been added. In scenario 410, this rule will prevent the addition of triangle S.

Figure 16:
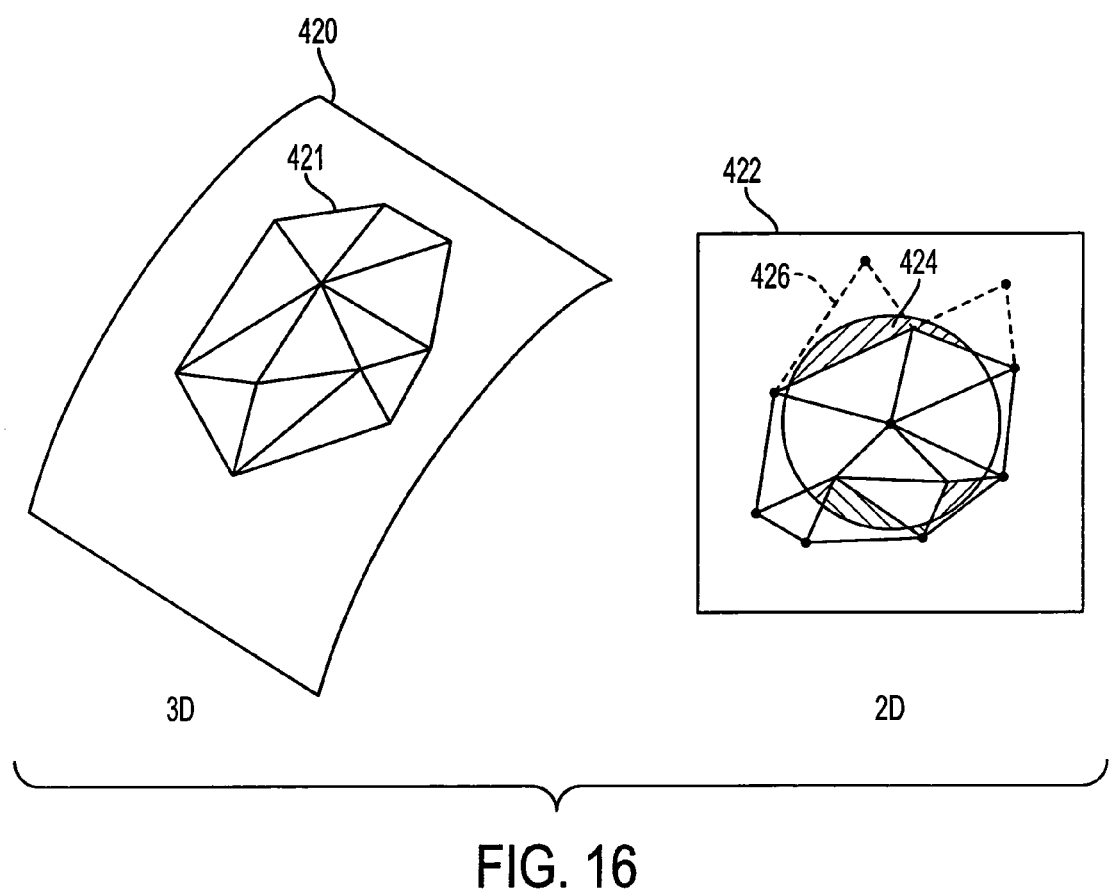
FIG. 16 shows a case where the area of interest in 3D space 420 has been initially estimated (e.g. by traversing outward from the center or hit point to find the points in the brush area), and the corresponding 2D area 422—mapped by the local parameterization—has shaded areas 424 that are not covered by the local parameterization.

The final mapping, and therefore the points needed for the surface neighborhood, is not known until after the local parameterization has been computed. FIG. 16 shows a case where the area of interest in 3D space 420 has been initially estimated (e.g. by traversing outward from the center or hit point to find the points in the brush area), and the corresponding 2D area 422—mapped by the local parameterization—has shaded areas 424 that are not covered by the local parameterization. Triangles indicated by dashed edges 426 are added to cover the area of interest. However, the addition of triangles requires re-parameterizing, which in turn requires re-mapping the area of interest. Although unlikely, this may create new gaps. The process may be repeated until no gaps exist, and re-parameterization with the added triangles is inexpensive.

When using the traversal method to grow the area of interest, then a case may occur where the three vertices of a new triangle have already been added (as vertices of other triangles). As described above, adding two edges of a new triangle where the three vertices have already been added should be avoided. When all the valid triangles have been added, and new triangles with two new edges and the three vertices already mapped remain, a seam should be created. This might be the case, for example, when a stamp is being wrapped around a long cylinder. In this situation, it is recommended, although not necessary, to duplicate the vertices along the existing edge, and add the missing triangles by propagating a seam. Additionally, the algorithm may decide to create additional internal seams, to help the parameterization of intricate areas.

Other Aspects and Features

The discussion above mentions the local parameterization of 3D surfaces or models mapped to a 2D space. The techniques discussed above are also applicable to multi-dimensional surfaces. A practical example is the case of a three dimensional hyper-surface in a four-dimensional space (e.g., the surface is animated). It may be desirable to incorporate explicitly the fourth dimension in the mapping process. The surface may be considered with two parameters plus time, which leads to a space, which is three parameters plus time, which is full animational space. For example, a 4D surface might be a flag that is waving. As the shape changes over time, the pattern is re-projected or re-warped on-the-fly for every frame. In this case, rather than associating (U and V) with (X, Y, and Z), (U, V, and W) are associated with (X, Y, Z, and t (time)). Otherwise, application of the invention is the same.

The continuously changing surface neighborhood (upon which a local parameterization may be based) has uses other than creating local parameterizations. For example, the smoothly changeable surface neighborhood may be used to smoothly apply a displacement map to local areas of the surface. Other numerical vertex operations or effects on the surface may also be performed with the local neighborhood.

As mentioned in the "General Embodiment" section, the present invention can also be generalized to volumes or n-dimensional models. A volumetric brush (e.g. a sphere or cylinder) rather than a two-dimensional brush can be used. Triangles are replaced with tetrahedrons, and instead of a surface, a whole 3D volume is mapped. Thus, the term "area of interest" also indicates a region of interest, a locus of interest, for example volumetric areas or regions, or a locus of vertices in an n-dimensional model. The terms "model" and "surface", are defined to include n-dimensional models or surfaces, and are not limited to 3D models or surfaces. Similarly, terms such as sub-neighborhood, local neighborhood, surface neighborhood, sub-parameterization, local parameterization, etc. all define both 3D as well as n-dimensional data and operations. An n-dimensional surface is also called a dimension n variety, in a p dimension space, where p>n. The usual case corresponds to p=3, n=2.

Figure 17:
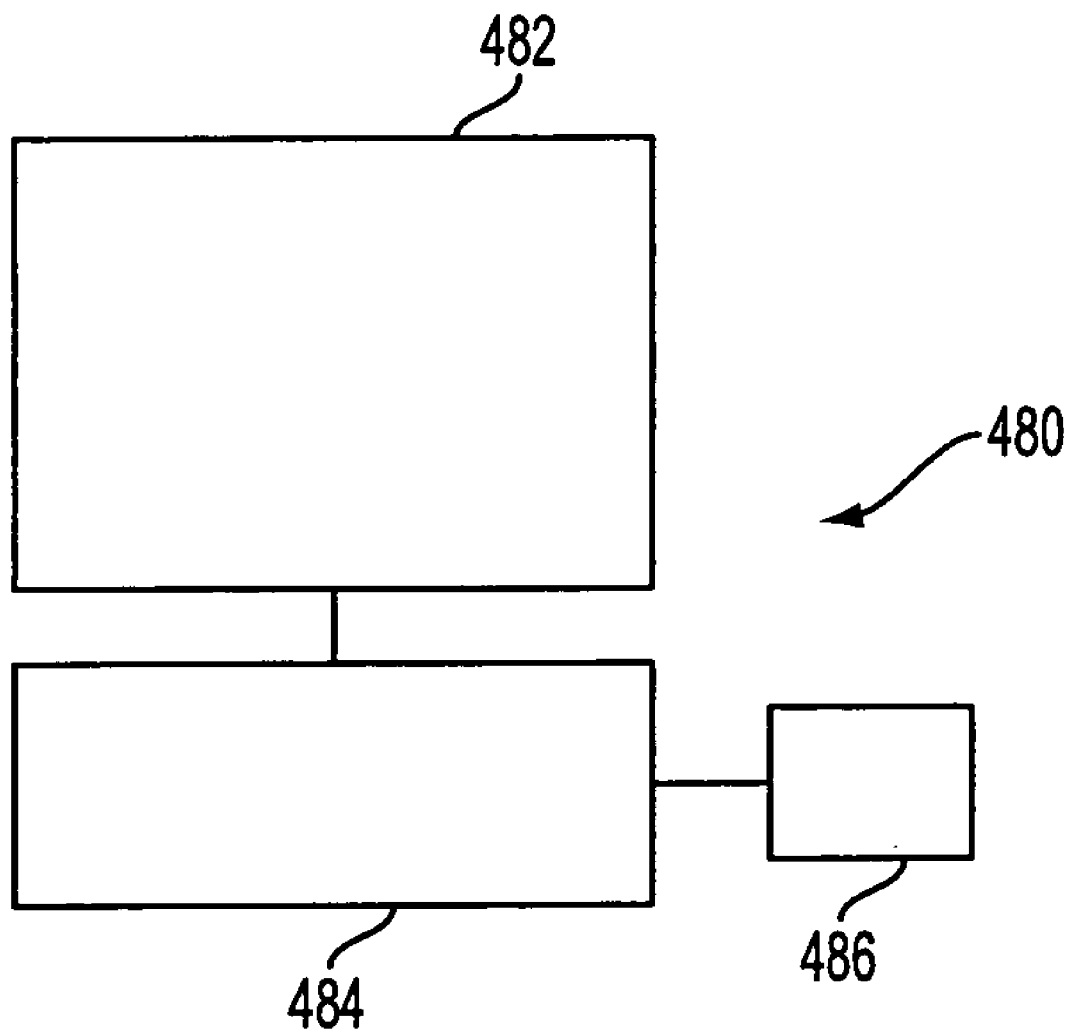
FIG. 17 shows hardware of the present invention.

FIG. 17 shows hardware of the present invention. The present invention is included in a system 480, such as depicted in FIG. 17, which includes a display 482 upon which an output of the present invention may be displayed. A computer or CPU 484, preferably of the high performance workstation type, performs the processes described herein and an input device 486, such as a mouse or stylus with pad, is used to control functionality described herein. The system 480 also includes storage (not shown), such as disc storage and RAM in which the processes of the present invention can be stored and on which the processes can be distributed. The processes can also be distributed via a network, such as the Internet.

Figure 18:
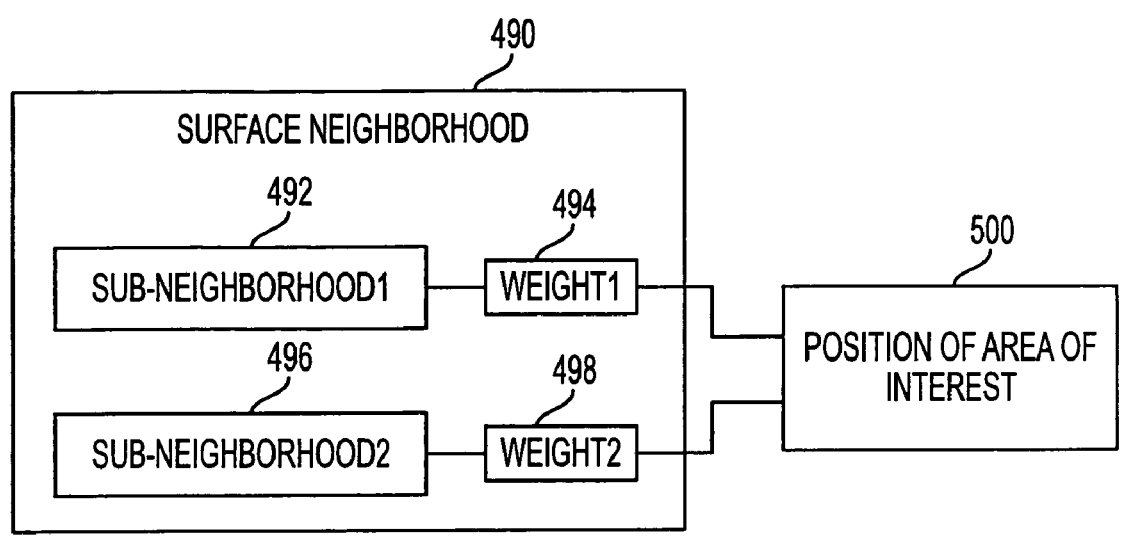
FIG. 18 shows a data structure of the present invention.

FIG. 18 shows a data structure of the present invention. Surface neighborhood 490 has sub-neighborhood1 492 with associated weight1 494. Surface neighborhood 490 also has sub-neighborhood2 496 with associated weight2 498. The weights may be linked to or based on a position of an area of interest 500. A local parameterization and its sub-parameterizations may be similarly structured. Although two sub-neighborhoods 492/496 are shown, at least two or more may be used, and in a preferred embodiment, three or more sub-neighborhoods are used.

An aspect of the present invention has been described with respect to a system that defines a region of vertices of a model, determines a local neighborhood comprised of at least two or more sub-neighborhoods of vertices of the model, and finds an intersection of the sub-neighborhoods that is sufficient to contain the region of interest and sufficient to enable the region of interest to be moved or extended while remaining within the region of intersection.

The present invention may be used with a paint system where the stamp follows the surface. The present invention may also be used to interactively place a decal texture on a surface. The present invention can be used for interactive image filtering of data associated with the surface. In general, the filters are defined as a 2D grid, which can be applied to an image using the fact that pixels are regularly spaced. For example, it is possible to produce a local image corresponding to vertex data (say a pressure per vertex), and apply an edge detection or a smoothing filter to it, then store back the result in the per vertex data. This can be used also to paint or modify per-vertex displacements.

The present invention may also be used for interactive surface resampling. Generally, resampling in 2D has been easier than directly resampling in 3D. The present invention provides a way to fairly parameterize a piece of the surface, resample in UV space, and modify back the surface. This can also potentially be coupled with a brush based interface, where resampling happens in real time under the brush.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method, comprising:
    defining a patch of vertices of a model; and
    determining a parameterization of a local neighborhood patch covered by a common overlap patch where two or more sub-neighborhood patches of the model partially overlap such that each sub-neighborhood has a portion that does not overlap one or more other sub-neighborhoods, wherein
    the common overlap patch of the sub-neighborhood patches is of sufficient size to contain a region of interest and sufficient to enable the region of interest to be moved or extended while remaining within common overlap patch, wherein
    the parameterization of the local neighborhood patch is determined based on the two or more sub-neighborhood patches including the common overlap patch and also based on the location of the region of interest with respect to the model, and wherein
    when the location of the region of interest is moved or extended with respect to the model within the local neighborhood patch the parameterization is automatically re-determined based on the two or more sub-neighborhood patches including the common overlap patch and also based on the previously presented location of the region of interest with respect to the model.

2. A method according to claim 1, wherein when the location of the point or region of interest moves or retracts out of one of the sub-neighborhoods that sub-neighborhood is no longer included as part of the basis for re-determining the parameterization, and when the location of the point or region of interest moves or extends into a sub-neighborhood that sub-neighborhood becomes part of the basis for re-determining the parameterization.

3. A series of displayable frames, each including a rendering of a model with an image locally mapped to the model by a local parameterization, where a location or form of the image relative to the model changes between frames, where if the image stays within a portion of the local parameterization then the local parameterization is re-interpolated with sub-parameterizations that are re-weighted according to the changes to the location or form of the image, and where if the image moves out of the portion of the local parameterization, then a sub-parameterization is added or dropped before the local parameterization is re-interpolated.

4. A method for generating the displayable frames according to claim 3.

5. A volatile or non-volatile computer-readable medium storing informing to enable a computer to generate the displayable frames according to claim 3.

6. A method of generating a series of displayable frames, each including a rendering of a model with an image locally mapped to the model by a local parameterization, where a location or form of the image relative to the model changes between frames, where if the image stays within a portion of the local parameterization then the local parameterization is re-interpolated with sub-parameterizations that are re-weighted according to the changes to the location or form of the image.

7. The method according to claim 6, wherein if the image moves out of the portion of the local parameterization, then the local parameterization is re-interpolated without one of the sub-parameterizations and/or with an additional sub-parameterization.

8. A volatile or non-volatile computer-readable medium storing informing to enable a computer to perform the method according to claim 6.

9. A volatile or non-volatile computer-readable medium storing informing to enable a computer to perform the method according to claim 7.

10. A volatile or non-volatile computer-readable storage storing information to enable a computer to perform a method of providing smoothly changing target parameterizations of a mesh model in accordance with continuous user input that changes an area of the mesh model being parameterized by the smoothly changing target parameterizations, comprising:
    for any input of the continuous user input that changes, relative to the mesh model, the shape or location of an area of the mesh model that is being parameterized, different local parameterizations of different portions of the mesh model are combined by interpolation into a target parameterization based on the user input or the area changed according thereto, where for different inputs different target parameterizations are generated, and wherein
    the different target parameterizations are used to continuously remap an image onto the changing area of the mesh model allowing the image to be displayed as smoothly moving/changing on the mesh model in accordance with the continuous user input.

11. A method of determining local parameterizations of a surface in accordance with a target local neighborhood of the surface, comprising:

selecting two or more local neighborhoods out of a set of predefined local neighborhoods of the surface, where an overlap of the two or more local neighborhoods covers the target local neighborhood;

either before or after being selected, computing parameterizations for each of the respective selected local neighborhoods;

either before or after being selected, weighting each of the selected parameterizations; and interpolating the combined weighted parameterizations into a target local parameterization of the target local neighborhood of the surface.

12. A method according to claim 11, wherein the selecting is based on one or more values of one or more user parameters.

13. A method according to claim 12, wherein the parameterizations for each of the respective selected local neighborhoods are computed based on the one or more values of the one or more user parameters.

14. A method according to claim 13, wherein the user parameters are the coordinates of a reference point of the target local neighborhood.

15. A method according to claim 14, wherein the user parameters further comprise a size of the target local neighborhood.

16. A method according to claim 15, wherein the user parameters further comprise a set of set of numerical values which control the computing of the parameterizations for each of the respective selected local neighborhoods.

17. A method according to claim 11, wherein the selected parameterizations are weighted according to respective components of a barycentric coordinate of a reference point of the target local neighborhood.

18. A method according to claim 11, wherein the interpolating comprises using a same process to center and align, in a consistent manner, the parameterizations of the respective selected local neighborhoods, and using a simple weighted average of the parameterizations.

19. A volatile or non-volatile computer-readable medium storing informing to enable a computer to perform a method according to claim 11.

20. A volatile or non-volatile computer-readable medium storing informing to enable a computer to perform a method according to claim 12.

21. A volatile or non-volatile computer-readable medium storing informing to enable a computer to perform a method according to claim 13.

22. A volatile or non-volatile computer-readable medium storing informing to enable a computer to perform a method according to claim 14.

23. A volatile or non-volatile computer-readable medium storing informing to enable a computer to perform a method according to claim 15.

24. A volatile or non-volatile computer-readable medium storing informing to enable a computer to perform a method according to claim 16.

25. A volatile or non-volatile computer-readable medium storing informing to enable a computer to perform a method according to claim 17.

26. A volatile or non-volatile computer-readable medium storing informing to enable a computer to perform a method according to claim 18.

* * * * *

UNITED STATES PATENT AND TRADEMARK OFFICE
CERTIFICATE OF CORRECTION

PATENT NO. : 7,034,824 B2  
APPLICATION NO. : 10/244599  
DATED : April 25, 2006  
INVENTOR(S) : Jerome Maillot It is certified that error appears in the above-identified patent and that said Letters Patent is hereby corrected as shown below:

Title Page Column, Line 3 Item 54, change "PARAMATERIZATION" to --PARAMETERIZATION--.

Column 1, Line 3, change "PARAMATREIZATION" to --PARAMETERIZATION--.

Column 4, Line 64, after "occur" insert --or--.

Column 14, Line 2, change "previously presented" to --new--.

Signed and Sealed this

Twelfth Day of February, 2008

JON W. DUDAS  
*Director of the United States Patent and Trademark Office*